US008786492B2

(12) United States Patent
Fuss et al.

(10) Patent No.: US 8,786,492 B2
(45) Date of Patent: Jul. 22, 2014

(54) METHOD FOR DIRECTIONAL DIGITAL DATA TRANSMISSION BETWEEN AN AIRCRAFT AND A GROUND STATION

(75) Inventors: Tim Fuss, Hamburg (DE); Uwe Schwark, Ottersberg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/287,366

(22) Filed: Nov. 2, 2011

(65) Prior Publication Data

US 2012/0063522 A1 Mar. 15, 2012

Related U.S. Application Data

(63) Continuation of application No. PCT/EP2010/056109, filed on May 5, 2010.

(60) Provisional application No. 61/175,553, filed on May 5, 2009.

(30) Foreign Application Priority Data

May 5, 2009 (DE) ......................... 10 2009 019 995

(51) Int. Cl.

| | |
|---|---|
| ***H04B 7/185*** | (2006.01) |
| ***H01Q 1/28*** | (2006.01) |
| ***H04B 7/04*** | (2006.01) |

(52) U.S. Cl.

CPC .............. *H04B 7/18506* (2013.01); *H04B 7/04* (2013.01); *H01Q 1/286* (2013.01)
USPC ............................ 342/367; 455/431; 343/705

(58) Field of Classification Search

USPC .................... 342/367; 343/705, 708; 455/431
See application file for complete search history.

(56) References Cited

U.S. PATENT DOCUMENTS

| | | | | |
|---|---|---|---|---|
| 2,425,303 | A * | 8/1947 | Carter | 343/705 |
| 3,500,406 | A | 3/1970 | Parker | |
| 3,683,281 | A * | 8/1972 | Watts, Jr. | 342/420 |
| 4,134,118 | A * | 1/1979 | Corbett | 342/461 |
| 4,336,543 | A * | 6/1982 | Ganz et al. | 343/705 |
| 4,635,066 | A | 1/1987 | St. Clair et al. | |
| 5,123,112 | A | 6/1992 | Choate | |

(Continued)

FOREIGN PATENT DOCUMENTS

| | | | |
|---|---|---|---|
| DE | 102005063077 | A1 | 7/2007 |
| EP | 2131443 | A1 | 12/2009 |

(Continued)

OTHER PUBLICATIONS

Higgins B., "Phones in the Air", Elektor Electronics, Canterbury, GB, vol. 17, No. 186, Feb. 1, 1991, pp. 20-22, XP000200098.

*Primary Examiner* — Gregory C Issing
(74) *Attorney, Agent, or Firm* — Lerner, David, Littenberg, Krumholz & Mentlik, LLP

(57) ABSTRACT

The invention relates to a method for digital and directional data transmission between aircraft and ground stations. In this arrangement data is exchanged digitally and directly, in other words directly by means of directional antennae, between the aircraft and the ground stations. Furthermore, transmission lobes are adapted during flight, and the directional antennae on the aircraft only illuminate regions on the ground that are located at a minimum distance across the flight path of the aircraft.

14 Claims, 5 Drawing Sheets

100
104
105
103
400
400
upper critical angle
main beam direction (normal))
403
402
302
lower critical angle
401
401

(56) References Cited

U.S. PATENT DOCUMENTS

| | | | | |
|---|---|---|---|---|
| 5,444,762 | A * | 8/1995 | Frey et al. | 455/431 |
| 6,208,304 | B1 * | 3/2001 | Strickland | 343/705 |
| 6,285,878 | B1 | 9/2001 | Lai | |
| 6,323,813 | B1 * | 11/2001 | Neat | 343/705 |
| 6,593,880 | B2 * | 7/2003 | Velazquez et al. | 342/367 |
| 6,642,894 | B1 * | 11/2003 | Gross et al. | 343/705 |
| 7,359,703 | B2 * | 4/2008 | McGuffin et al. | 455/431 |
| 7,395,084 | B2 * | 7/2008 | Anttila | 455/552.1 |
| 2003/0069043 | A1 * | 4/2003 | Chhaochharia et al. | 455/561 |
| 2003/0142024 | A1 * | 7/2003 | Carson | 343/705 |
| 2006/0030311 | A1 * | 2/2006 | Cruz et al. | 455/431 |
| 2006/0229103 | A1 * | 10/2006 | Monk | 455/562.1 |
| 2007/0087695 | A1 * | 4/2007 | Cohen et al. | 455/63.4 |
| 2008/0240062 | A1 * | 10/2008 | Lynch et al. | 370/338 |

FOREIGN PATENT DOCUMENTS

| | | | |
|---|---|---|---|
| RU | 2252900 | C1 | 5/2005 |
| WO | 2007011978 | A1 | 1/2007 |
| WO | 2007074175 | A1 | 7/2007 |

* cited by examiner

METHOD FOR DIRECTIONAL DIGITAL DATA TRANSMISSION BETWEEN AN AIRCRAFT AND A GROUND STATION

CROSS-REFERENCE TO RELATED APPLICATIONS

This application is a continuation of International Application No. PCT/EP2010/056109, filed May 5, 2010, which claims the benefit of the filing date of German Patent Application No. 10 2009 019 995.0, filed on May 5, 2009 and of U.S. provisional patent application No. 61/175,553, filed on May 5, 2009, the entire disclosures of which are hereby incorporated herein by reference.

FIELD OF THE INVENTION

The invention relates to the communication of aircraft with the ground. In particular, the invention relates to a method for directional digital data transmission between an aircraft and at least one first ground station, to an aircraft comprising a digital transmitter unit for directional digital data transmission between an aircraft and a ground station, and to a communication system for directional digital data transmission between an aircraft and a ground station.

TECHNOLOGICAL BACKGROUND

In the communication systems presently in use, which communication systems connect an airplane with the outside world for the purpose of data transmission, omni-directional antennae are used. Because of the low antenna gain of such omni-directional antennae, significantly improved transmission outputs are required, both for transmitters placed on the airplane, and for transmitters placed on the ground.

With omni-directional antennae in or on an airplane, the transmissions from the airplane to ground stations other than the supplying ground station could act as interference. This interference can result in a considerable reduction in the spectral efficiency of the entire communication system. The same can also apply in the opposite direction of such a communication channel.

Furthermore, in hitherto-used communication networks between aircraft and ground stations, predominantly analog transmission methods are used. As a rule, in analog transmission methods a parameter of a carrier signal is altered by means of an analog, modulating signal, e.g. the amplitude, frequency or phase. In this arrangement each amplitude value and phase value is permissible within a defined value range, and is relevant at each point in time.

Purely analog signal transmission methods are, as a rule, prone to outside interferences which are, for example, caused by extraneous systems, or are prone to thermal noise that is inherent in any transmission system. In contrast to this, digital methods allow considerably more robust transmission because of the possibility of using error protection measures or correction measures, e.g. by means of signal reconstruction, equalization or error protection coding.

Documents DE 102005063077 and WO 2007074175 describe a device for recording digital messages which by means of data link devices are exchanged between a pilot of an aircraft and personnel on the ground.

US 2006/0229103 A1 describes a communication system wherein a single antenna is provided at an airplane, which antenna generates a single beam having independently steerable, narrow lobes. Such an arrangement with a single antenna is disadvantageous aerodynamically as well in respect of the transmitting and receiving characteristics. The known antenna comprises an array of six antenna elements, wherein the entire antenna extends over a region of at least 50 cm from the bottom surface of the fuselage downwardly. In case of a roll movement of the airplane a smaller effective antenna area faces the ground station.

SUMMARY OF THE INVENTION

It is an object of the invention to state an improved data transmission between an aircraft and a ground station. The object is achieved by the subject-matters of the independent claims.

Stated are a method for directional digital data transmission between an aircraft and at least one first ground station, an aircraft comprising a digital transmitter unit for directional digital data transmission between the aircraft and at least one first ground station, and a communication system for directional digital data transmission between an aircraft and at least one first ground station, according to the features of the independent claims. Improvements of the invention are shown in the dependent claims.

The described embodiments equally relate to the method, the aircraft and the communication system.

It should be pointed out that the method can be implemented in the presently described sequence of the method-related steps. However, any other sequence of the method-related steps is possible for implementing the method according to the invention.

According to an embodiment of the invention, a method for directional digital data transmission between an aircraft and at least one first ground station by means of a ground-to-air direct radio system is stated. In this arrangement the method involves the following steps: providing a first antenna for an aircraft and a second antenna for a first ground station, wherein at least one of the first and second antennae is a directional antenna. This embodiment further comprises the step of transmitting digital data directly between the aircraft and the first ground station.

It should be explicitly pointed out that in this and in any other embodiment the aircraft may be an airplane.

In this arrangement in this and in any other embodiment of the invention, the directional antenna of the aircraft, due to its physical design is spatially directed in terms of its characteristics of radiating electromagnetic waves. The directional antenna can comprise several emitting or receiving antenna elements that can be controlled, by means of beam forming and/or beam steering techniques, by a control unit in the aircraft in order to spatially vary the transmission lobe/reception lobe of said antenna, and in order to adapt it to desired parameters. This will be explained in more detail later on. In this arrangement a preferred main transmission direction or main reception direction of the directional antenna on the aircraft can be set for direct digital ground-to-air communication. Likewise, the relative phase of the signals, which signals drive the various antenna elements, can be varied in order to achieve a desired transmission lobe with a preferred main beam direction of the directional antenna.

In other words, the directional antenna is an antenna with distinct directionality.

In the context of the present invention, the terms “beam forming” and “beam steering” refer to adaptation of the antenna characteristics in terms of the shape and direction of the reception and/or transmission lobe of the directional antenna.

In this arrangement, if desired, it is also possible to use array antennae.

Furthermore, with this and with any other embodiment of the invention it is possible for the antennae, described in the context of the present invention, of the aircraft to be arranged on or in the aircraft. Likewise, antennae of ground stations can be arranged on or in the ground station.

In this arrangement, with this optimized direct digital ground-to-air communication system the entire aircraft communication, including both passenger communication and cockpit communication, can be transmitted digitally and directly to the ground, without having to resort to a satellite.

Because of the possibility of adapting the main beam direction of such a directional antenna, the capacity of this ground-to-air direct radio system in the allocated spectrum can be significantly increased. This can not only improve the supply, but can also reduce user fees to the operator of the aircraft as compared to user fees associated with satellite-bound communication.

Likewise, it is possible to provide a directional antenna, both for the aircraft and for the ground station. In other words, the antennae on the aircraft and on the ground stations emit radio signals to each other in a directional manner so that the interference of mutual use in both directions of transmission is reduced.

The at least one directional antenna does not emit in all spatial directions in other words, emission is not isotropic, and thus has antenna gain that also acts in the direction of reception. In this manner, signals from transmitters outside the main beam direction are suppressed, and the transmission link gains capacity because interference is suppressed. Furthermore, in one region several users can access the same frequency that has been allocated to the system. In this arrangement the term “user”, both presently and in the context of the entire present invention, is used in relation to the aircraft and to ground stations.

The antenna concept of the present invention with directional antennae improves the use of the allocated frequency spectrum and reduces undesirable interferences.

It is explicitly pointed out that in this and in any other exemplary embodiment of the invention a multitude of ground stations can be involved, which are interlinked with each other in a network.

The following should be pointed out in relation to the digital information transmission and data transmission: in the digital information transmission and data transmission process it is possible, by means of adequate shielding of the physical value from the outside world, by means of a suitable selection of the intervals and by means of the use of error-correcting codes, to reduce to any desired degree the probability of information losses at the expense of the transmission rate. This advantage of digital data transmission as compared to analog data transmission is advantageously used by the present invention. In other words, more reliable data transmission between the aircraft and the first ground station can be provided.

According to this embodiment of the invention, the antenna concept used in the aircraft can comprise the use of lateral antennae and directional antennae, which are installed on both sides on the fuselage of the aircraft. In the case of an airplane the two laterally arranged antennae can be installed in front of or behind the wings, the belly fairings, or they can even be installed on the wings or stabilizers themselves in order to keep areas blanked-out by aircraft components to a minimum.

In this arrangement the term “lateral” refers to position information that describes installation locations for directional antennae that are not situated in the centre on the transverse axis of the airplane. This is described in more detail with reference to FIGS. 2 and 4.

Furthermore, it is possible, by means of this method, to align the antennae according to their relative frequency of use. Since access to the first antenna and to further antennae on the aircraft most of the time takes place at a small angle from horizontal, these antennae are correspondingly installed and/or re-adjusted at an angle at which the antennae have the best characteristics according to their use.

In this arrangement the first antenna for an airplane can, for example, be of a design with a ratio of antenna length to antenna width, which ratio is greater than 1. In other words, directional antennae can be used in the method, which directional antennae are relatively long as compared to their width. This can be desirable because the transmission lobe/reception lobe of the antenna may be narrow in the horizontal direction, while it may be wide in the vertical direction. In this arrangement the type of radial illumination results from the antenna design in relation to the height and width of the antenna. In the intended installation position in which the longitudinal axes of the antenna and of the aircraft extend in the same direction, the width of the antenna has a significant influence, while the length has a negligible influence, on the additional aerodynamic resistance which the antenna system generates.

According to a further embodiment of the invention, the method involves the further step of: adapting a transmission lobe of the directional antenna on the basis of at least one of the two parameters of flight path of the aircraft and position of the ground station.

In this process both adapting the alignment of the transmission lobe and adapting the form of the transmission lobe can take place. This applies analogously also to the reception lobe of the directional antenna.

In order to take into account changes in the position of the aircraft during the flight in terms of the quality of data transmission, the method provides for the use of algorithms for controlling the transmission lobe/reception lobe of the directional antenna so that the main beam direction of the first antenna of the aircraft is, or remains, aligned to the first ground station, and/or so that the main beam direction of the second antenna of the first ground station is, or remains, aligned to the aircraft.

Furthermore, the method according to the invention makes it possible to achieve a synergy effect on the one hand between the use of directional antennae and the selection of a clearly defined region that is illuminated by the antennae situated laterally on the fuselage of the aircraft: by means of the stated method it is possible to illuminate the ground by means of the directional antennae of the airplane in such a manner that a predefined region, directly below the aircraft, on the ground is not illuminated. In other words, only a region between x km (near position) and y km (far position) laterally of the flight path of the aircraft is illuminated, which will be described in more detail in the context of the following FIGS. 4 and 5. This ensures that the radio cells or ground stations which are directly underneath the flight path of the aircraft or which are in close proximity to the flight path, are not acquired by the directional antennae of the aircraft, and thus do not become the supplying ground station. Only those ground stations are received that are located at a minimum distance across the flight path of the aircraft. This minimum distance can be determined in a further method step, and subsequently the transmission lobe/reception lobe of the first directional antenna and/or of further directional antennae on the aircraft can be adapted accordingly.

This provides an advantage in that the change-of-angle speed during horizontal tracking of the aircraft by the transmission lobe/reception lobe of the second antenna of the first ground station does not exceed a defined maximum value. This particular feature of the method in turn provides an advantageous effect in that simplified beam steering and/or beam forming mechanisms for the first ground station are made possible.

Furthermore, the maximally occurring Doppler frequency shift is limited because the aircraft never flies directly towards the supplying cells, in other words towards the first ground station and possibly also further ground stations, or is able to move away from it or them.

Because of the adaptation of the main beam direction of the directional antenna the capacity of this ground-to-air direct radio system can be significantly increased in the allocated spectrum. This improves the supply and reduces user fees as compared to satellite-based systems.

In this arrangement it is possible for the adaptation of the transmission lobe/reception lobe of the directional antenna to be carried out by a control unit. In the case where the directional antenna is arranged on the aircraft, the control unit is also located in the aircraft. If the directional antenna is arranged on the first ground station, then the control unit is arranged in the first ground station.

Furthermore, this embodiment can also comprise: continuous measuring of any change in the strength of a signal received by the directional antenna during the flight of the aircraft, wherein the adaptation of the transmission lobe/reception lobe takes place on the basis of the measured change of the signal.

Likewise, it should be explicitly pointed out that in this and in any other embodiment of the invention the term “transmission lobe” is used synonymously with the term “antenna lobe”. It should be pointed out that such a transmission lobe/reception lobe inherently comprises a main beam direction and an upper and lower critical angle of emission of electromagnetic waves.

In addition, a method step is possible which relates to compensating for aircraft roll by means of beam steering and/or beam forming methods.

According to a further embodiment of the invention, adaptation of the reception lobe is carried out by means of an algorithm, wherein adaptation takes place on the basis of at least one parameter selected from the group comprising flight speed of the aircraft, influence of at least one Doppler shift, signal loss, interference among various participants in the radio system, and available bandwidth.

In this arrangement, other participants can be represented by other aircraft or other ground stations that also communicate in the radio network of this ground-to-air direct radio system.

According to the invention, both the first and the second antennae are directional antennae. Furthermore, the method involves the following step: adapting a transmission lobe of the first and the third antennae, wherein adaptation takes place in such a manner that when the aircraft is in flight both a main beam direction of the antenna of the aircraft remains directed at the first ground station, and at the same time a main beam direction of the third antenna of the first ground station remains directed at the aircraft.

In other words, at any point in time of the flight the two directional antennae used transmit in the direction of the desired ground station. In this arrangement even during a handover process the transmission lobe of the first antenna can be varied in such a manner that the main beam direction of this first directional antenna can be changed from the presently-used first ground station to the second ground station, to which the data channel is to be established by means of the handover process.

In this arrangement in the context of the present invention the term “handover” is used to describe the process in a communication network in which an aircraft changes from one radio cell to the next in the period in which a data connection exists. In this arrangement the radio cells are provided by the ground stations. In this arrangement it should be explicitly pointed out that the term “hand off” used in US English is to be interpreted as being synonymous to the above.

According to a further embodiment of the invention, the directional antenna is arranged on the aircraft, and the method further comprises the following steps: spatial alignment of the directional antenna on the aircraft, wherein spatial alignment takes place in such a manner that a region arises that is not illuminated by a transmission lobe of the directional antenna, which region extends along the flight path of the aircraft on the ground.

In other words, antennae provided at the aircraft are installed on both sides and laterally on the fuselage of the aircraft. In this arrangement the vertical angular range, which is covered by the transmission lobes of the antennae, is defined in such a manner by means of alignment that only those regions are illuminated that are not situated directly underneath the aircraft along the flight path. In other words, only that region is illuminated by the directional antennae laterally of the flight path on the ground, which region extends between a near position and a far position away from the flight path. This is illustrated in FIGS. 4 and 5.

In this manner it can be ensured, by means of the method, that those stations which the aircraft overflies directly vertically, and which stations are in close proximity to the projection of the flight path on the ground, do not become supplying ground stations of the aircraft. Thus, the aircraft only incorporates in this ground-to-air direct radio system ground stations that are located at a minimum distance transverse of the flight path. Among other things this is associated with an advantage in that in respect of the change-of-angle speed during the airplane’s horizontal tracking of the ground station, or during the ground station’s horizontal tracking of the airplane, a maximum value is not exceeded. In both cases such tracking is carried out with the adaptation and readjustment of the respective transmission lobe. A corresponding adaptation of the transmission output is also possible.

In other words, by means of selecting and determining the non-illuminated region in the spatial alignment of the directional antenna this maximum value of the change-of-angle speed can be determined. This can advantageously result in that simple mechanisms and algorithms may be used for adapting the transmission lobes of the directional antennae.

A further advantage of this embodiment relates to limiting the maximally occurring Doppler frequency shift in the digital data transmission between the aircraft and the first ground station. Because of the lateral arrangement of the directional antennae on the aircraft, and because of the spatial alignment of the directional antennae in such a manner that a non-illuminated region arises underneath the aircraft, it becomes possible to ensure that the aircraft never directly flies towards the supplying ground station or can never directly move away from it.

Furthermore, it is possible for a mechanism to select the ground station with the best combination of handover interval, Doppler influence, signal loss, interference among various users in the radio system, and available bandwidth. In other words, an algorithm can be provided in a storage device in the aircraft, which algorithm from the above-mentioned parameters determines, by calculation, the ground station with which at the given point in time a data channel is to be established or maintained.

In this arrangement, spatial alignment of the directional antennae can take place during installation of the directional antenna on the fuselage of the aircraft. However, subsequent mechanical adjustment of the directional antenna, for example by means of a positioning actuator during the flight, is possible for spatially aligning the directional antenna.

According to a further embodiment of the invention, the first antenna is arranged in an installation location on the aircraft, which installation location is selected from the group of locations including: laterally on a fuselage of the aircraft; on a vertical stabilizer; on a horizontal stabilizer; on a wing; on an engine nacelle; and on a belly fairing that aerodynamically covers the transition between an airfoil and a fuselage of the aircraft.

In the case of the horizontal stabilizer, the outer edges of said horizontal stabilizer are a possible location for the antennae. In the case of the vertical stabilizer it is possible to install the directional antenna on the lateral surfaces of the vertical stabilizer, or to integrate it in the tail unit itself. Furthermore, one or several directional antennae can be arranged laterally on the aircraft.

In this arrangement in each embodiment the spatial alignment can be selected depending on the relative frequency of use.

According to a further embodiment of the invention, the method further comprises the following steps: receiving a signal from the first ground station by the first antenna; receiving a further signal from at least one second ground station by the first antenna; and selecting one of the two ground stations by a selection unit of the aircraft for the transmission of digital data on the basis of at least one parameter selected from the group comprising handover interval; influence of at least one Doppler shift; signal loss; interference among various users of the radio system; and available bandwidth.

According to a further embodiment of the invention, a method is stated which involves the additional step of carrying out a handover process between the first ground station and a second ground station.

According to a further embodiment of the invention, an aircraft comprising a digital transmitter unit (or a digital transmitter unit/receiving unit) for directional digital data transmission between the aircraft in flight and a ground station in a ground-to-air direct system is stated. In this arrangement the digital transmitter unit comprises a first antenna for at least emitting signals for digital data transmission directly to the ground station. In this arrangement the first antenna is a directional antenna, and the directional antenna is designed to be affixed at an installation location selected from the group including locations laterally on a fuselage of the aircraft; on a vertical stabilizer; on a horizontal stabilizer; on a wing; on an engine nacelle; and on a belly fairing that aerodynamically covers the transition between an airfoil and a fuselage of the aircraft.

Therewith in this and in any other exemplary embodiment of the invention bi-directional data transmission between the aircraft and one or several ground stations is made possible.

According to the invention, the digital transmitter unit further comprises a second antenna that is designed as a directional antenna. In this arrangement the second antenna is designed to be mounted in a mirror-symmetrical manner relative to the first antenna with regard to a mirror axis situated in the middle of the fuselage.

This exemplary embodiment is, among other things, shown in FIG. 2.

With this arrangement, symmetrical illumination of the lateral regions to the right-hand side and to the left-hand side of the flight path of the aircraft can be achieved. Because of the identical spatial alignment of the antennae arranged laterally on the left-hand side and on the right-hand side of the aircraft, and because of the resulting identical lower critical angles and upper critical angles of the respective transmission lobes, a direct comparison between ground stations acquired by the right-hand antenna, and ground stations acquired by the left-hand antenna becomes possible. Thus it is possible to ensure improved selection of that ground station that offers the best combination of handover interval, influence of a Doppler shift, signal loss, interference among various users of the radio system, and available bandwidth. This can considerably improve data transmission in the digital ground-to-air direct radio system.

According to a further exemplary embodiment of the invention, the fuselage of the aircraft comprises a region facing the sky, and a region facing the ground. In this arrangement the directional antenna is arranged on the fuselage of the aircraft at an angle $\alpha$ relative to a surface normal of the region facing the sky, which angle $\alpha$ is selected from the group comprising $80° \leq \alpha \leq 145°$; $95° \leq \alpha \leq 165°$; $100° \leq \alpha \leq 155°$; $105° \leq \alpha \leq 140°$; $115° \leq \alpha \leq 130°$; $280° \leq \alpha \leq 185°$; $265° \leq \alpha \leq 195°$; $260° \leq \alpha \leq 205°$; $255° \leq \alpha \leq 220°$; and $245° \leq \alpha \leq 230°$.

In this arrangement arranging the directional antenna on the aircraft at an angle of 80° or 280° is possible in order to take into account or compensate for aircraft roll. A corresponding method step of compensating for aircraft roll by means of beam steering and/or beam forming methods is also possible.

This arrangement of the two directional antennae, which have been arranged in a mirror-symmetrical manner on the aircraft, ensures that a non-illuminated region results directly underneath the aircraft. This region can then only be illuminated to a limited extend by means of the antennae, because the angle to the antenna normal is too large.

According to a further embodiment of the invention, the digital transmitter unit in the aircraft further comprises an electrical control unit for adapting a transmission lobe of a first antenna on the basis of a flight path of the aircraft.

In other words, the control unit in the aircraft is able to independently and self-sufficiently implement a beam steering algorithm. In this manner the antenna gain of the set directional antenna is further increased as a result of beam steering. Signals of transmitters outside the main beam direction are suppressed as a result of this; the capacity of the transmission link between the aircraft and the ground station is improved because these interference effects are suppressed. In addition, in the region, several users, in other words several aircraft and/or several ground stations, can access the same frequency allocated to the ground-to-air direct radio system. Apart from providing an improved data connection, the above can also result in reduced expenditure incurred by the operators of the aircraft.

According to a further embodiment of the invention, the digital transmitter unit comprises a storage device in the aircraft, wherein in the storage device at least one first algorithm is stored, by means of which the control unit carries out adaptation of the transmission lobe, or a second algorithm is stored, by means of which the control unit carries out a handover process.

According to a further exemplary embodiment of the invention, a communication system for directional digital data transmission between an aircraft and at least one first ground station is designed according to claim 15.

It should be explicitly pointed out that in the communication system both a plurality of aircraft and several ground stations can simultaneously communicate with each other.

The feature whereby, apart from digital data transmission between the aircraft and the ground station, the data transmission always takes place in a directional and direct manner, which can significantly increase the capacity in the allocated spectrum, may be considered a key aspect of the invention. In this manner improved supply of data to the aircraft can be provided. Likewise it is possible to reduce user fees as compared to user fees associated with present-day satellite-bound data transmission. It may be considered a further key aspect of the present invention that emission in the directional antennae of the aircraft takes place in such a manner that only those ground regions are illuminated or beamed at that with regard to the flight path of the aircraft comprise a low change-of-angle speed and a small Doppler frequency offset. Apart from this the invention is in a position, by means of a handover process, to provide continuous data transmission for the aircraft by means of a plurality of ground stations. In this manner it may be possible to reduce the required transmission output of the respective antennae, which apart from a lower electromagnetic radiation load can result in a reduction in the power requirements in the airplane.

Furthermore, it should be explicitly pointed out that all the embodiments of the invention also relate to communication in situations when the aircraft is located on the ground.

Further embodiments and advantages of the invention are set out in the following description of the figures.

The illustrations in the figures are diagrammatic and not to scale.

Figure 1:
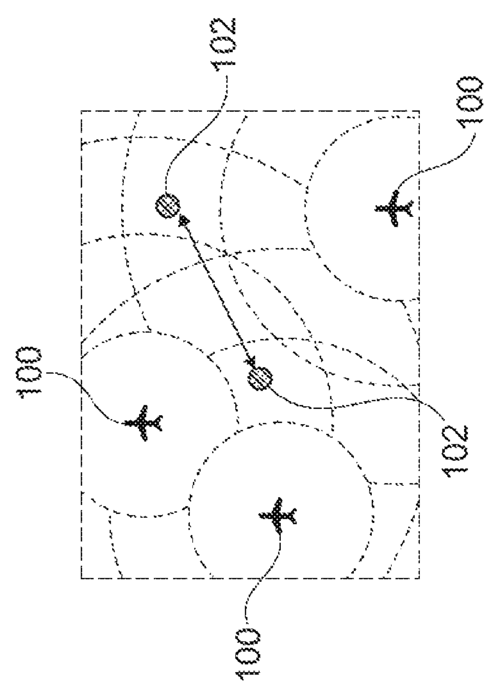
FIG. 1 shows an example of the state of the art relating to data transmission for airplanes.

Below, preferred embodiments of the present invention are described with reference to the figures.

In the following description of the figures the same reference characters are used for identical or similar elements.

DETAILED DESCRIPTION OF EMBODIMENTS

FIG. 1 shows an example from the state of the art in which by means of isotropic emitters analog data is transmitted from airplanes 100 to ground stations 102.

Figure 2:
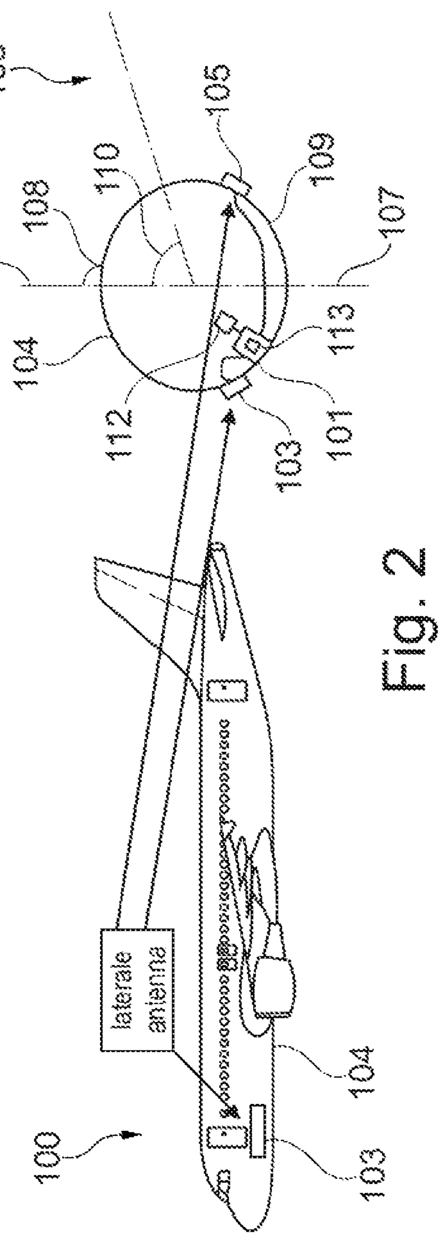
FIG. 2 shows a diagrammatic two-dimensional view of an airplane according to an embodiment of the invention.

FIG. 2 shows an embodiment of the present invention. In this arrangement an aircraft is shown which is designed as an airplane 100 and which laterally or on the side of the fuselage 104 comprises a first directional antenna 103. In this arrangement the right-hand part of FIG. 2 shows a cross section of the fuselage 104, with the illustration showing that on the aircraft fuselage the first antenna 103 and the second antenna 105 are arranged in mirror symmetry relative to the mirror axis 107 in the middle of the fuselage, which antennae 103, 105 are designed as directional antennae.

Also shown are the skywards facing region 108 of the fuselage, and the region 109 of the fuselage facing the ground. Furthermore, the angle "α" 110 is shown. The surface normal 111 of the region 108 facing the sky is also shown in FIG. 1. Furthermore, the digital transmitter unit 101 that is electrically connected to the first antenna 103 and to the second antenna 105 is shown. By means of it, directional digital data transmission between the aircraft in flight and a first ground station (not shown) can be provided in a ground-to-air direct radio system.

Depending on the aircraft type, the antennae 103 and 105 can be installed in front of or behind the wings, or even on the wings or stabilizers themselves in order to keep blanked-out areas resulting from aircraft components to a minimum.

In this arrangement the right-hand part of FIG. 2 shows that the first antenna 103 is arranged at an angle "α" on the exterior of the fuselage, which angle is approx. 260°. In contrast to this, the second antenna 105 is arranged at an angle "α" of approx. 100°.

Since the two antennae 103 and 105 are directional antennae, they do not emit electromagnetic radiation in all spatial directions, and consequently provide antenna gain that also acts in the direction of reception. Thus, advantageously, signals from transmitters situated outside the main beam direction of the two antennae are suppressed, as a result of which the capacity of the transmission path to the ground station is increased. It should explicitly be pointed out that it is also possible for a plural number of aircraft can access the ground stations using the same frequency allocated to the system.

Figure 3:
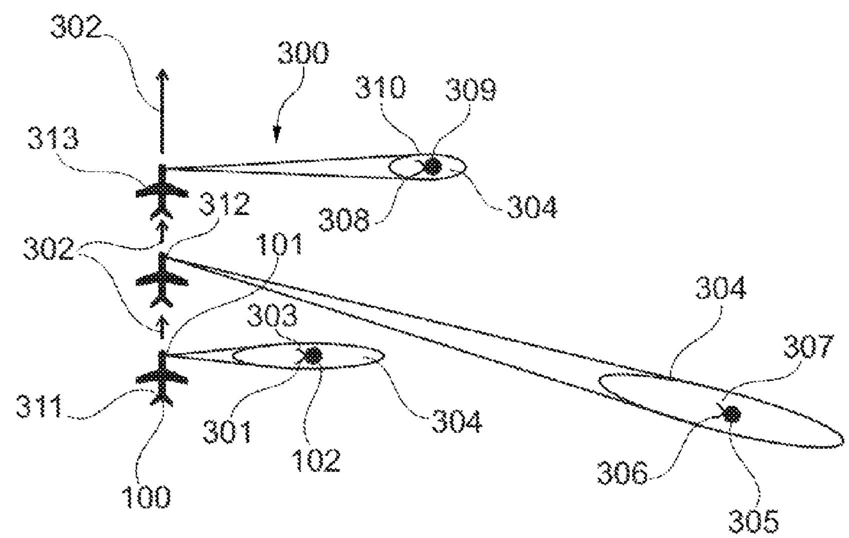
FIG. 3 shows a diagrammatic two-dimensional view of a communication system according to an embodiment of the invention.

FIG. 3 shows a communication system 300 for directional digital data transmission between an aircraft 100 and a first ground station 102. In this arrangement a first digital transmitter unit 101 on the aircraft and a second digital transmitter unit 301 on the first ground station are shown. The first digital transmitter unit comprises a first antenna 103 (not shown), and the second digital transmitter unit comprises a third antenna 303. In this arrangement the first antenna 103 is designed as a directional antenna. The third antenna 303 can be designed as an isotropic emitter, which makes possible a combination comprising an omni-directional emitter and a directional antenna. However, it is also possible for both to be designed as directional antennae. Furthermore, the digital transmitter units are designed for transmitting digital data directly between the aircraft and the first ground station.

In this arrangement FIG. 3 further shows that by means of the adaptation of the transmission lobe 304 of the first antenna optimal illumination of the far region and the near region can take place. In this arrangement three different states 311, 312, 313 of the aircraft along the flight path 302 are shown in which apart from the first ground station the further ground stations 305 and 308 are beamed at by the digital transmitter unit 101 in the aircraft, and correspondingly digital data is exchanged. In this arrangement a handover process takes place between the three different states of the aircraft 100. In other words, FIG. 3 shows adaptation of the transmission lobe by means of a control unit (not shown) that ensures that the main beam direction of the antenna 103 is in each case aligned to the ground station 102, 305 or 308 in use at the time. Likewise, in the respective ground station such a beam steering method can be applied so that the antenna lobe of the respective antenna (303, 307 or 310) of the ground station remains aligned to the aircraft 100.

In this arrangement FIG. 3 shows that the transmission lobe and/or the reception lobe of a directional antenna that uses this digital data transmission method can be adapted in such a manner that the shape of the region subjected to emission is optimally adapted to the given structure of the network comprising the ground stations. Moreover, various near regions and far regions can be illuminated. In selecting the ground station which is to be selected as the next communication partner, or as the unit supplying the aircraft, a mechanism can be used which selects the ground station with the best combination of handover interval, Doppler influence, signal loss, interference, and available bandwidth.

In other words, the diagram shows the manner in which a transmission lobe of the directional antenna is adapted on the basis of at least one of the two parameters of flight path of the aircraft and position of the ground station.

Figure 4:
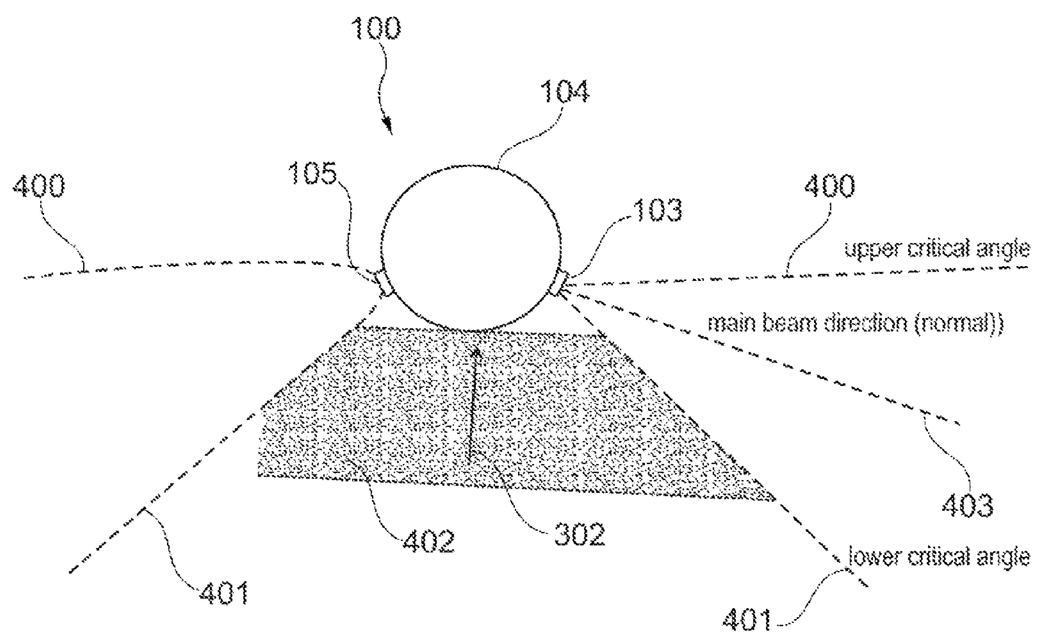
FIG. 4 shows a diagrammatic two-dimensional view of a cross section of an airplane according to an embodiment of the invention.

FIG. 4 shows an aircraft 100, shown in cross section, which comprises a fuselage 104. In this arrangement, analogously to FIG. 2, mirror-symmetrical positioning of two directional antennae 103 and 105 is shown. In this arrangement, an upper critical angle 400 and a lower critical angle 401 of the transmission lobes of the two antennae are shown. Due to the fact that these are directional antennae, and due to the selected alignment of the antennae, a non-illuminated region 402 arises which extends along the flight path 302 of the aircraft on the ground. Furthermore, a main beam direction 403 is shown. This provides an advantage in that the change-of-angle speed during horizontal tracking of the aircraft by means of the transmission lobe of the third antenna of the first ground station does not exceed a defined maximum value. This particular characteristic of the method in turn provides an advantageous effect in that simplified beam steering mechanisms for the first ground station are made possible.

Figure 5:
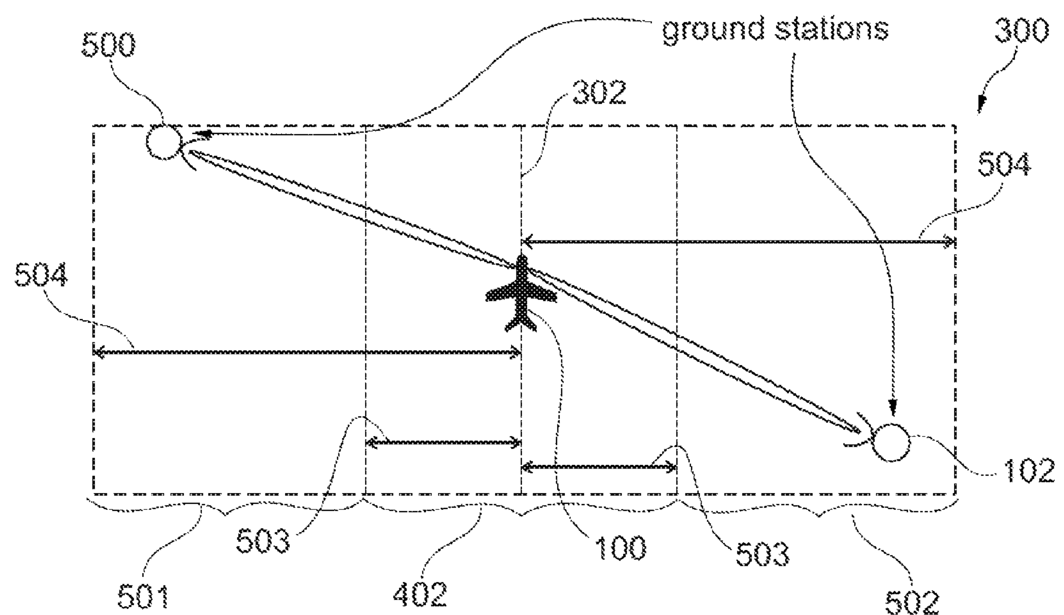
FIG. 5 shows a diagrammatic two-dimensional view of a communication system according to an embodiment of the invention.

FIG. 5 shows a communication system 300 with an aircraft 100 that by means of the method according to the invention simultaneously communicates with two ground stations 102 and 500. The diagram shows the region 402 that cannot be illuminated or can be illuminated only to a certain extent, which region 402 extends along the flight path 302 underneath the aircraft 100. This region ends at a distance 503 across the direction of flight. This distance at the same time defines the near position at which the illuminated region commences. This region in turn ends in this embodiment in the far position, which is defined by the distance 504. In this arrangement it is, of course, also possible, if required, for regions of different sizes and shapes on the right-hand side and on the left-hand side of the flight path to be illuminated by the aircraft.

Figure 6:
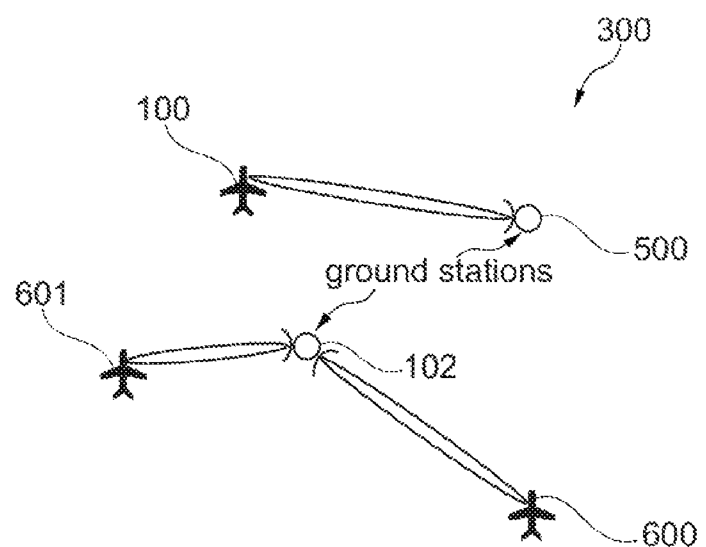
FIG. 6 shows a diagrammatic two-dimensional view of a communication system according to an embodiment of the invention.

FIG. 6 shows a communication system 300 in which three aircraft 100, 600 and 601 simultaneously with two ground stations according to an exemplary embodiment of the invention use a method for directional digital data transmission. In this arrangement, by means of directional antennae, digital data is transmitted directly between the aircraft and the ground station, wherein the respective transmission lobes of the directional antennae are adapted on the basis of the then current flight path of the aircraft. This takes place with regard to at least one of the parameters selected from the group comprising flight speed of the aircraft, influence of at least one Doppler shift, signal loss, interference, and available bandwidth.

Figure 7:
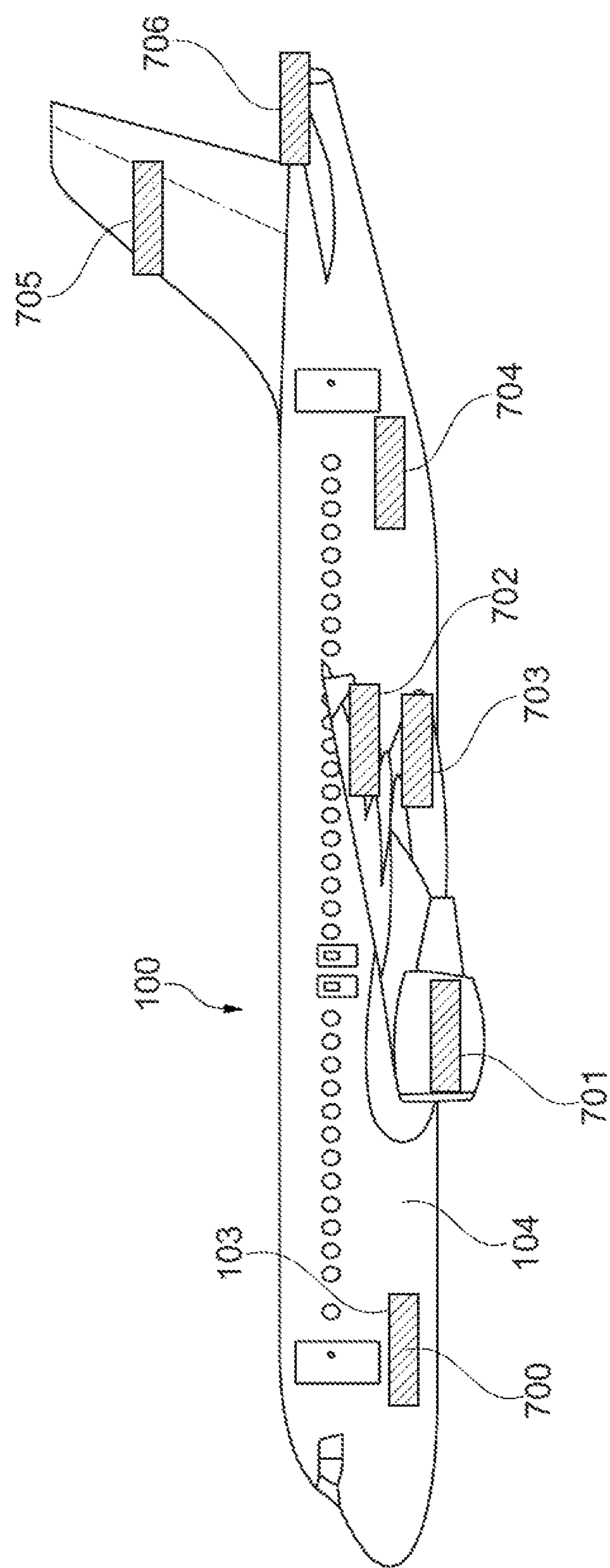
FIG. 7 shows an airplane with possible installation locations of a directional antenna according to an embodiment of the invention.

FIG. 7 shows an airplane on which various installation locations 700 to 706 of the directional antenna on the airplane are shown for achieving the above-described advantages of the invention. For example, the directional first antenna 103 can be arranged in the lateral position 700 and 704 on the fuselage 104 of the airplane. At the same time, or as an alternative, placement of the antenna on the engine nacelle 701, on the wing 702, on the belly fairing 703, on the vertical stabilizer 705 and/or on the horizontal stabilizer 706 is possible.

Figure 8:
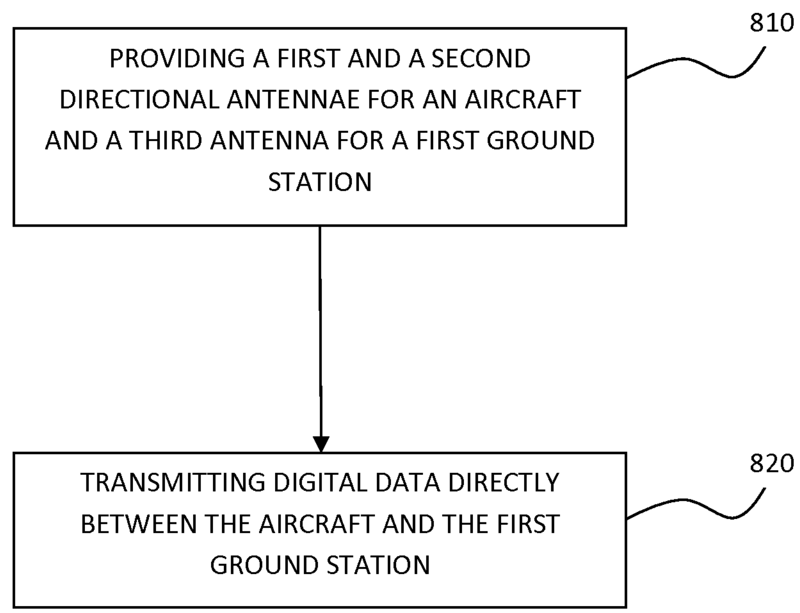
FIG. 8 shows a flow chart of a method according to an embodiment of the invention.

FIG. 8 shows a flow chart of a method 800. In this arrangement the method comprises the first step 810 of providing a first and a second directional antenna for an aircraft and a third antenna for a first ground station. Apart from this, the method comprises the second step 820 of transmitting digital data directly between the aircraft and the first ground station.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments, described above, of the invention. Reference characters in the claims are explicitly not to be interpreted as limitations.

The invention claimed is:

1. A method for directional digital data transmission between an aircraft and at least one first ground station by a ground-to-air direct radio system, the method comprising the steps of:

providing a first antenna array and a second antenna array for the aircraft, the first and second antenna arrays being configured as directional antenna arrays;

wherein the first antenna array and the second antenna array are arranged in mirror symmetry relative to a mirror axis in the middle of the fuselage of the aircraft;

wherein each of the first antenna array and the second antenna array has a length along a longitudinal axis of the aircraft and a width in a direction perpendicular to the longitudinal axis of the aircraft;

wherein the first and second directional antenna arrays are spatially aligned such that a region extending along a flight path of the aircraft on the ground is not illuminated by transmission lobes of the first and second antenna arrays;

wherein a ratio between the length and the width of the first antenna array is greater than 1 and a ratio between the length and the width of the second antenna array is greater than 1;

wherein a longitudinal axis of the first antenna array and a longitudinal axis of the second antenna array are substantially aligned with the longitudinal axis of the aircraft;

providing a third antenna for the first ground station; and transmitting digital data directly between the aircraft and the first ground station;

continuously measuring at least one of a change in strength of a signal received by the first antenna array and a change in strength of a signal received by the second antenna array during a flight of the aircraft; and adapting a transmission lobe of at least one of the first antenna array and a transmission lobe of the second antenna array on the basis of the measured change in strength.

2. The method of claim 1, wherein the third antenna is configured as a directional antenna.

3. The method of claim 1, the method further comprising:

adapting a transmission lobe of at least one of the first and second directional antenna arrays on the basis of at least one parameter selected from the group consisting of a flight path of the aircraft and a position of the ground station.

4. The method of claim 3, wherein adaptation takes place on the basis of at least one parameter selected from the group consisting of flight speed of the aircraft, influence of at least one Doppler shift, signal loss, interference among various participants in the radio system, and available bandwidth.

5. The method of claim 3, the method further comprising:

adapting a transmission lobe of the first antenna array and a transmission lobe of the third antenna;

wherein adaptation takes place in such a manner that when the aircraft is in flight a main beam direction of the first antenna array of the aircraft remains directed at the first ground station, and at the same time a main beam direction of the third antenna of the first ground station remains directed at the aircraft.

6. The method of claim 1, wherein the first and second antenna arrays, respectively, are arranged at first and second installation locations on the aircraft, wherein the installation locations are selected from the group consisting of: laterally at the fuselage of the aircraft; at a vertical stabilizer; at a horizontal stabilizer; at a wing; at an engine nacelle; and at a belly fairing that aerodynamically covers the transition between an airfoil and a fuselage of the aircraft.

7. The method of claim 1, further comprising:

receiving a signal from the first ground station by the first antenna array;

receiving a second signal from at least one second ground station by the first antenna array; and selecting one of the two ground stations by a selection unit of the aircraft for the transmission of digital data on the basis of at least one parameter selected from the group consisting of: handover interval; influence of at least one Doppler shift; signal loss; interference; and available bandwidth.

8. The method of claim 1, further comprising:

carrying out a handover process between the first ground station and a second ground station.

9. The method of claim 1, further comprising:

adapting a transmission lobe of the first antenna array to a second ground station during and/or after a handover process.

10. An aircraft comprising a digital transmitter unit for directional digital data transmission between the aircraft in flight and at least one first ground station in a ground-to-air direct radio system, the digital transmitter unit comprising:

a first antenna array and a second antenna array for at least emitting signals for digital data transmission directly to the ground station;

a control unit;

wherein the first antenna array and the second antenna array are configured as directional antenna array; and wherein the first antenna array is configured for being affixed at an installation location selected from the group consisting of: laterally on a fuselage of the aircraft; on a vertical stabilizer; on a horizontal stabilizer; on a wing; on an engine nacelle; and on a belly fairing that aerodynamically covers the transition between an airfoil and a fuselage of the aircraft; wherein the second antenna array is arranged in a mirror-symmetrical manner relative to the first antenna array with regard to a mirror axis situated in the middle of the fuselage;

wherein each of the first antenna array and the second antenna array has a length along a longitudinal axis of the aircraft and a width in a direction perpendicular to the longitudinal axis of the aircraft;

wherein a ratio between the length and the width of the first antenna array is greater than 1 and a ratio between the length and the width of the second antenna array is greater than 1;

wherein a longitudinal axis of the first antenna array and a longitudinal axis of the second antenna array are substantially aligned with the longitudinal axis of the aircraft; and wherein the first and second directional antenna array are spatially aligned such that a region extending along the flight path of the aircraft on the ground is not illuminated by transmission lobes of the first and second antenna arrays;

wherein the control unit is configured to continuously measure at least one of a change in strength of a signal received by the first antenna array and a change in strength of a signal received by the second antenna array during a flight of the aircraft; and wherein the control unit is configured to adapt at least one of a transmission lobe of the first antenna array and a transmission lobe of the second antenna array on the basis of the measured change in strength.

11. The aircraft of claim 10, wherein the first antenna array is arranged on the fuselage of the aircraft at an angle $\alpha$ relative to the mirror axis in the middle of the fuselage of the aircraft which angle $\alpha$ is selected from the group consisting of: $80° \leq \alpha \leq 145°$; $95° \leq \alpha \leq 165°$; $100° \leq \alpha \leq 155°$; $105° \leq \alpha \leq 140°$; $115° \leq \alpha \leq 130°$; $280° \leq \alpha \leq 185°$; $265° \leq \alpha \leq 195°$; $260° \leq \alpha \leq 205°$; $255° \leq \alpha \leq 220°$; and $245° \leq \alpha \leq 230°$.

12. The aircraft of claim 10, the transmitter unit further comprising:

an electrical control unit for adapting a transmission lobe of the first antenna array on the basis of a flight path of the aircraft.

13. The aircraft of claim 12, the transmitter unit further comprising:

a storage device;

wherein in the storage device at least one first algorithm is stored by means of which the control unit carries out adaptation of the transmission lobe, or a second algorithm is stored by means of which the control unit carries out a handover process.

14. A communication system for directional digital data transmission between an aircraft and at least one first ground station; the communication system comprising:

a first digital transmitter unit on the aircraft comprising:

a first antenna array and a second antenna array for at least emitting signals for digital data transmission directly to the ground station;

a control unit;

wherein the first and the second antenna array are configured as directional antenna arrays;

wherein the first antenna array is arranged for mounting at an installation location selected from the group consisting of: laterally at a fuselage of the aircraft, at a vertical stabilizer, at a horizontal stabilizer, at a wing, at an engine nacelle, and at a belly fairing that aerodynamically covers the transition between an airfoil and a fuselage of the aircraft;

wherein the second antenna array is arranged in mirror symmetry to the first antenna array in respect of a mirror axis in the middle of the fuselage;

wherein each of the first antenna array and the second antenna array has a length along a longitudinal axis of the aircraft and a width in a direction perpendicular to the longitudinal axis of the aircraft;

wherein a ratio between the length and the width of the first antenna array is greater than 1 and a ratio between the length and the width of the second antenna array is greater than 1;

wherein a longitudinal axis of the first antenna array and a longitudinal axis of the second antenna array are substantially aligned with the longitudinal axis of the aircraft; and wherein the first and second directional antenna array are spatially aligned such that a region extending along the flight path of the aircraft on the ground is not illuminated by transmission lobes of the first and second antenna arrays; and a second digital transmitter unit at the first ground station comprising a third antenna;

wherein the transmitter units are configured to transmit digital data directly between the aircraft and the first ground station;

wherein the control unit is configured to continuously measure at least one of a change in strength of a signal received by the first antenna array and a change in strength of a signal received by the second antenna array during a flight of the aircraft; and wherein the control unit is configured to adapt at least one of a transmission lobe of the first antenna array and a transmission lobe of the second antenna array on the basis of the measured change in strength.

* * * * *